United States Patent
Axelrod et al.

(10) Patent No.: US 8,111,257 B2
(45) Date of Patent: Feb. 7, 2012

(54) SYSTEM AND METHOD FOR THE GENERATION OF NAVIGATION GRAPHS IN REAL-TIME

(75) Inventors: Ramon Axelrod, Holon (IL); Shai Berger, Giv'at Shmu'el (IL); Eyal Teler, Jerusalem (IL)

(73) Assignee: Aiseek Ltd., Ramat-Gan (IL)

( * ) Notice: Subject to any disclaimer, the term of this patent is extended or adjusted under 35 U.S.C. 154(b) by 960 days.

(21) Appl. No.: 12/017,695

(22) Filed: Jan. 22, 2008

(65) Prior Publication Data

US 2008/0220862 A1    Sep. 11, 2008

Related U.S. Application Data

(60) Provisional application No. 60/905,045, filed on Mar. 6, 2007.

(51) Int. Cl.
*G06T 13/00* (2011.01)
(52) U.S. Cl. ......................................................... 345/473
(58) Field of Classification Search .................... 345/473
See application file for complete search history.

(56) References Cited

U.S. PATENT DOCUMENTS

| | | | |
|---|---|---|---|
| 6,961,055 B2 * | 11/2005 | Doak et al. ................... | 345/419 |
| 6,983,283 B2 | 1/2006 | Sowizral et al. | |
| 7,173,622 B1 | 2/2007 | McLaughlin | |
| 7,187,377 B1 * | 3/2007 | Pella et al. ................... | 345/419 |
| 2003/0048849 A1 | 3/2003 | Tomita, Jr. et al. | |
| 2003/0058238 A1 * | 3/2003 | Doak et al. ................... | 345/419 |
| 2006/0036756 A1 | 2/2006 | Driemeyer et al. | |
| 2006/0103645 A1 | 5/2006 | Jacobson | |
| 2006/0280335 A1 | 12/2006 | Tomita, Jr. et al. | |

* cited by examiner

*Primary Examiner* — Ryan R Yang
(74) *Attorney, Agent, or Firm* — Sughrue Mion, PLLC

(57) ABSTRACT

A system and method for navigation graph generation in real time is provided including a dictionary operable to maintain information mapping surface features to navigational costs. Further included is a graphical module operable to transform geometrical data of a virtual world and associated navigational costs obtained from the dictionary into navigation data; a graph-generation module operable to translate the navigation data into a semi-generated navigation graph; and a physical module operable to receive the semi-generated navigation graph, and generate an updated navigation graph based on collisions test.

20 Claims, 6 Drawing Sheets

| Δh [meter] | cost |
|---|---|
| 0 | 0 |
| 0.5 | 1 |
| 1.0 | 2 |
| 1.5 | 3 |
| 2 | Infinite |

| Step height | 0 | h1 | h2 | h3 | ... | h29 | h30 | h31 | H3 |
|---|---|---|---|---|---|---|---|---|---|
| Cost | 0 | 1 | 1 | 1 | ... | 1 | 1 | 1 | 1 |

SYSTEM AND METHOD FOR THE GENERATION OF NAVIGATION GRAPHS IN REAL-TIME

CROSS-REFERENCE TO RELATED APPLICATION

This application claims benefit of U.S. provisional application No. 60/905,045 filed on Mar. 6, 2007 which is incorporated by reference, herein, in its entirety.

TECHNICAL FIELD

The present invention generally relates to computer graphics and computer game artificial intelligence (AI), and more particularly, to the generation of navigation graphs from raw geometry using computer graphics techniques.

BACKGROUND OF THE INVENTION

References

The following U.S. patents and publications provide useful background information, for which they are incorporated herein by reference in their entirety.

| | | |
|---|---|---|
| 20060036756 | February 2006 | Driemeyer; et al. |
| 20060280335 | December 2006 | Tomita; et al. |
| 20030048849 | March 2003 | Tomita; et al. |
| 20060103645 | May 2006 | Jacobson; |
| 6,983,283 | January 2006 | Sowizral, et al. |
| 7,173,622 | February 2007 | McLaughlin |

One of the requirements of artificial intelligence (AI) modules that are utilized in computer games and military simulations is to provide agents (i.e., game entities) with capabilities to accurately determine their motion in a three-dimensional (3D) environment or the game's virtual world.

The agents in a game use "pathfinding" algorithms to plan their path in the virtual world. Typically, these algorithms are based on searching navigation graphs in order to find a minimal path on the graphs, and then smoothing the path so the agent movement will look more natural. Navigation graphs are graphs with additional spatial information describing where an agent can move.

The navigation graph can be manually prepared by a game developer or automatically by a graph generation process. This process produces and updates the navigation data from geometrical and physical data of the virtual world, which include a description of the objects, their properties, and how they interact in the 3D environment.

When a computer runs an electronic game, the game engine automatically downloads the geometrical data and stores it in a local memory. Today, this information is used primarily for visualizing the virtual world to the player and for detection collision, but not for graph generation. The graphic processor renders the portions of the world that are visible from the player's current viewpoint, i.e., position and orientation within the virtual world. As the player navigates the virtual world, new objects may become visible while others pass from view.

In the related art, there are several techniques for generating navigation graphs. One technique is the physical based expansion, which generates the graph by moving the agent systematically, through the virtual world space using a game engine and checking for collisions. Specifically, this technique moves, using a game engine, an agent object in all directions each time in a small distance. Each point the agents visits is also expanded in the same fashion, until the entire space is exhausted.

Another technique for graph generation is known as the visibility graph building. This technique builds a navigation graph by placing nodes at all the vertices of the graphical objects and connecting only nodes that are visible to each another (i.e., an agent can move between these nodes in a straight line). A variant of this technique uses triangulation technique to form a "navigation mesh" made of triangles. A triangle is detected by scanning the angles around a node and finding an open sector. The vertices of polygons bounding that sector and the origin form triangles. At the beginning the node to be scanned for triangles is an origin and later all the edges.

Yet, another technique for graph generation is the volume filling voxelization, which tries to place an agent iteratively at all positions of the virtual world. If the agent can occupy two adjacent positions and a predefined set rules regarding their difference in height or in slope are satisfied, the objects are deemed connected. The rules for deciding which agents to connect may be based on the agents' type, e.g., humans or animals.

One of the major drawbacks of related art techniques is the substantial execution time of these techniques. As a result, the navigation graphs are generated "off-line", i.e., when the game is created. Thus, dynamic scenes cannot be rendered in real time, i.e., when the game is played, and thereby limiting the game experience. For example, only few obstacles in the walk-path can be added dynamically.

Therefore, it would be advantageous to provide a real-time solution for the generation of navigation graphs.

SUMMARY

To realize some of the advantages described above there is provided an apparatus and a method for generating navigation graphs in real time. The apparatus may include a dictionary operable to maintain information mapping surface features to navigational costs; a graphical module operable to transform geometrical data of a virtual world and associated navigational costs obtained from the dictionary into navigation data; a graph-generation module operable to translate the navigation data into a semi-generated navigation graph; and a physical module operable to receive the semi-generated navigation graph, and generate an updated navigation graph based on collisions test.

In an enhancement, the apparatus may further include a pre-graph module adapted for determining which parts of the virtual world have changed; and a post-graph module adapted for minimizing the size of the updated navigation graph.

More specifically, in the above enhanced apparatus the graphical module may be coupled to a rendering subsystem.

In an enhanced implementation, the transforming of the geometrical data into navigation data may include receiving geometrical data of at least one region in the virtual world and rendering, using the rendering subsystem, a plurality of bitmaps, which form the navigation data.

More specifically, the geometrical data may comprise polygons describing at least objects, surfaces and obstacles in the region.

More specifically the plurality of bitmaps may include information about properties of a terrain in the region.

In an enhanced implementation the graph-generation module may produce the semi-generated navigation graph by translating the bitmaps into nodes, edges and weights.

More specifically, the translation decisions may be performed based on the mapping information in the dictionary.

In an enhanced implementation, the graph-generation module may mark areas in the semi-generated navigation graph that can not be inferred from the bitmaps.

More specifically, the physical engine may perform collision tests on the marked areas.

Even more specifically, the collision tests may be performed using a game engine coupled to the physical module.

In an enhanced implementation, the physical module may be further operable to update the mapping information based on results of the collision tests.

The method for generating a navigation graph in real-time may include retrieving geometrical data of at least one region in a virtual world of a computer game. The method may further include retrieving mapping information for said at least one region; rendering a plurality of bitmaps of navigation data using the geometrical data and the mapping information; generating a semi-generated graph using the bitmaps; and generating the navigation graph based on collision tests performed on the semi-generated graph.

Computer program products including a computer readable medium having software instructions to enable a computer to implement the above techniques are also within the scope of the disclosed teachings.

Specifically, an implementation may include a computer-readable storage medium storing instructions to enable a computer to execute a method for generating a navigation graph in real-time, the method comprising retrieving geometrical data of at least one region in a virtual world of a computer game; retrieving mapping information for said at least one region; rendering a plurality of bitmaps of navigation data based on the geometrical data and the mapping information; generating a semi-generated graph based on the bitmaps; and generating a navigation graph based on collision tests performed on the semi-generated graph.

DETAILED DESCRIPTION

Figures 1, 2:
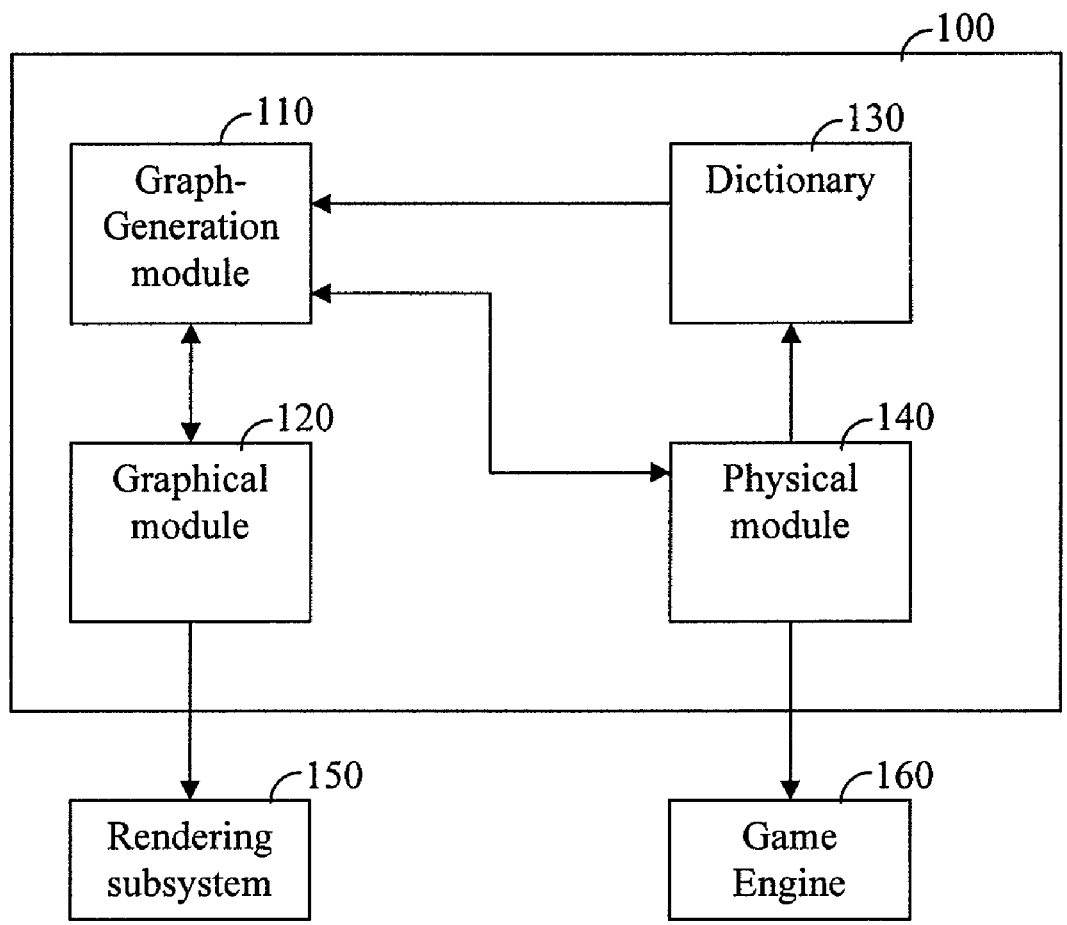
FIG. 1—is a block diagram of an exemplary implementation of a system of graph generation according to the disclosed teachings.
FIG. 2—is a table showing example mapping information in the dictionary.

FIG. 1 shows a non-limiting and exemplary block diagram of a system 100 adapted for generating navigation graphs in real-time in accordance with the disclosed teachings. The graph generation is the process of creating and updating navigation data based on geometrical and physical data provided by a game engine.

The system 100 comprises a graph-generation module 110, a graphical module 120, a dictionary 130, and a physical module 140. The graph-generation module 110 queries the other components of system 100 in order to learn about the virtual world and to produce the navigation data. The process of producing the navigation data is initiated by the game engine. The graphical module 120 receives geometric data and uses rendering techniques to transform them into navigation data useful for graph-generation module 110. The graphical module 120 interfaces with an external rendering subsystem 150, such as a GPU. The physical module 140 sends collision queries to a game engine 160 and processes the returned results. The game engine 160 holds the information on the virtual world in which the game is played and provides checks about whether an agent can walk somewhere. For the purpose of interfacing with the game engine 160, the physical module 140 implements an application programming interface (hereinafter the "world interface").

The dictionary 130 includes, per non-player character (NPC), mapping information of surface features to navigational costs. The surface features include, but are not limited to, material, width of passages, slopes, steps' heights, and so on. Specifically, the mapping information describes the movement abilities of different NPCs, in terms of costs. For example, as shown in FIG. 2 the cost for climbing steps with height differences of 0, 0.5 meter, 1 meter and 1.5 meter is 0, 1, 2, and 3 respectively. The cost can also be "infinite", for example, a maximal step beyond which an agent cannot climb (2 meter in the table shown in FIG. 2). The cost between entries in the dictionary is interpolated. For example, to compute the cost of a 1.2 meter step height, linear interpolation may be used. As will be described in detail below, the mapping information is created and updated using collision tests performed by the physical module 140.

In alternate implementations of the disclosed teachings the system 100 may include post-graph module adapted to minimize the size of the generated graph. Alternatively or collectively, the system 100 may include a pre-graph module adapted to determine which parts of the virtual world have changed in order to reduce the time required for updating a graph.

As mentioned above, the graph-generation module 110 controls the other components of the system 100 using a set of queries. Specifically, the module 110 is initiated by the game engine 160, which submits a Graph Generation query to the module 110. The query includes information of region(s) to be processed and one or more generation parameters for which the graph is to be generated. These parameters include, but are not limited to, required resolution, a list of NPC types, and so on.

The graph-generation module 110 submits an Instance Request to the game engine 160, through the physical module 140, in order to fetch the polygons describing objects, surfaces and obstacles in the generation region(s) or in region(s) that should be updated. The physical module 140 passes the retrieved polygon data to the graph-generation module 110, which in turn, passes this data together with relevant navigational costs fetched from the dictionary 130 to the graphical module 120.

The graphical module 120 utilizes the rendering subsystem 150 to render the geometry of a scene orthogonally from above and produces several "bitmaps" describing properties of the terrain and geometry. These properties include at least heights and slopes of surfaces, walk-able surfaces, and surface material. In addition, for each NPC, the graphical module 120 determines locations, in which the NPC can stand, cannot stand, can pass through, and cannot pass through. In accordance with an exemplary implementation of the disclosed teachings, six bitmaps are rendered: a) a terrain map showing the slopes in x-y directions and the floor material; b) a height map of the floor in each position; c) a last height map including last floor height map in each position; d) a roof height map including the height of the roof in each position;

e) an extrusion map describing the maximum floor height in a certain radius relative to the floor height, minimum roof height in a certain radius relative to the floor height, minimum of difference between floor height and roof height in a certain radius; and f) a weight map including the weights in a grid for a single direction or multiple directions. In other implementations different steps order may be used to render the bitmaps. The weight map may be in the form of a table that includes the "cost" of moving between two adjacent nodes (locations). The weights may be normalized to one.

The bitmaps are produced per "level" by rendering the geometry of the scene below the last level floor (corresponding to the floor in the last level, bitmap (b) discussed above). It should be noted that a level is a general 2D manifold and not merely a floor at the same height.

Figure 3A:
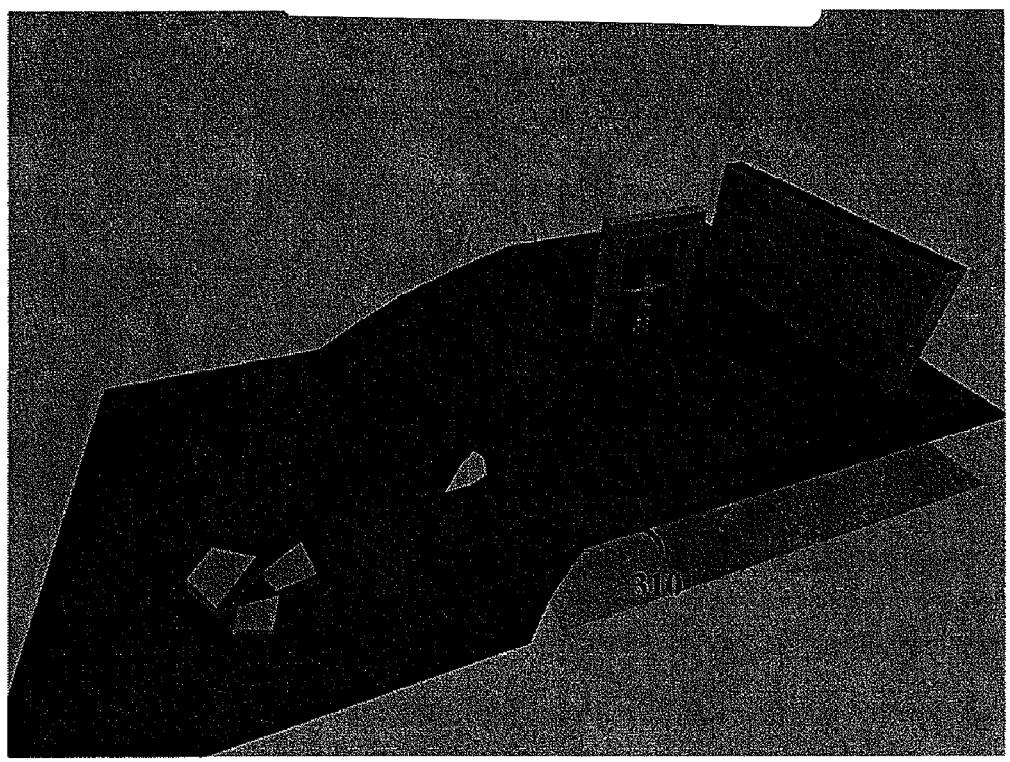
FIGS. 3A, 3B, 3C and 3D are pictures describing an example of the process executed by the graphical module.
Figure 3B:
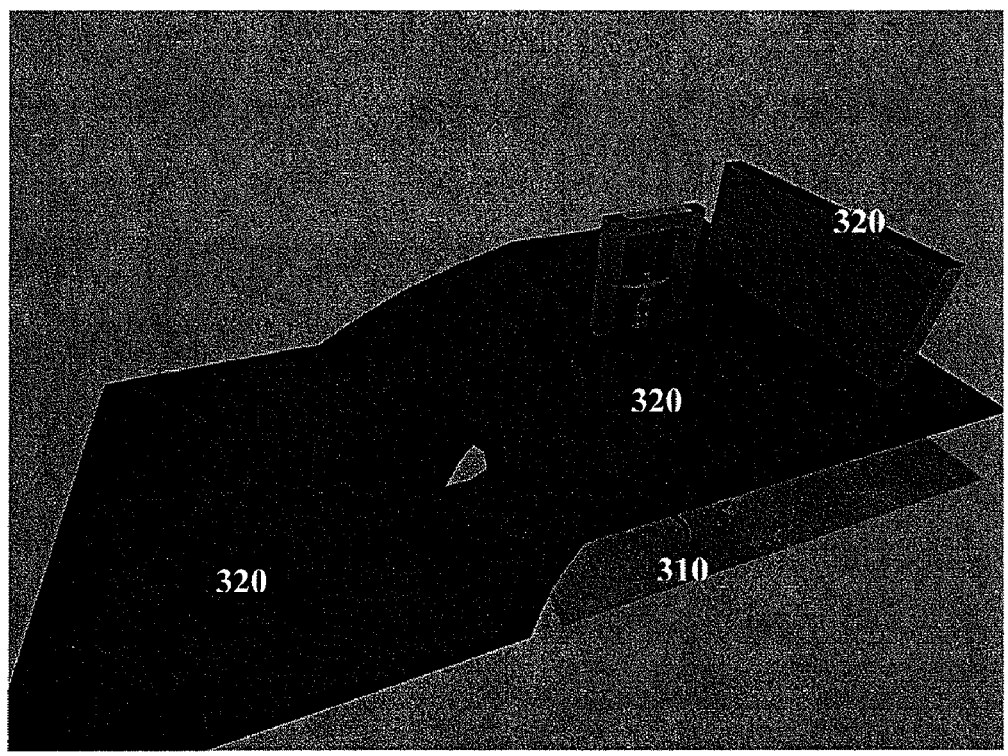

The graphical module 120 together with the rendering subsystem 150 renders the above bitmap for each level (floor) in five rendering stages. At the first stage, the rendering subsystem 150 finds a new level floor, such as the floor shown in FIG. 3A. At the second stage, a new roof 310 above the new level floor and below last level floor is detected. At the third stage, the height and slope of the walk-able surface above new floor and below new roof is detected. For example, the ground marked as 320 in FIG. 3B. At the fourth stage, the extrusion is performed to determine the maximum height and width of a NPC which can stand at each position without colliding. At the fifth stage, for each direction, the weight to move between two adjacent nodes (locations) is determined using rendered data and navigational costs received from the dictionary 130.

Each of the first second and third stages is processed in two passes. Firstly, the scene is rendered in "solid" mode (i.e., rendering the entire triangle) and secondly, rendering the scene in wire-frame mode (i.e., rendering the edges of triangles). This is done to ensure the visibility of triangles which are perpendicular to the rendering plain. It should be noted that the two passes are required if using a GPU. If using dedicated a dedicated software program only the second pass may be needed.

Figure 3C:
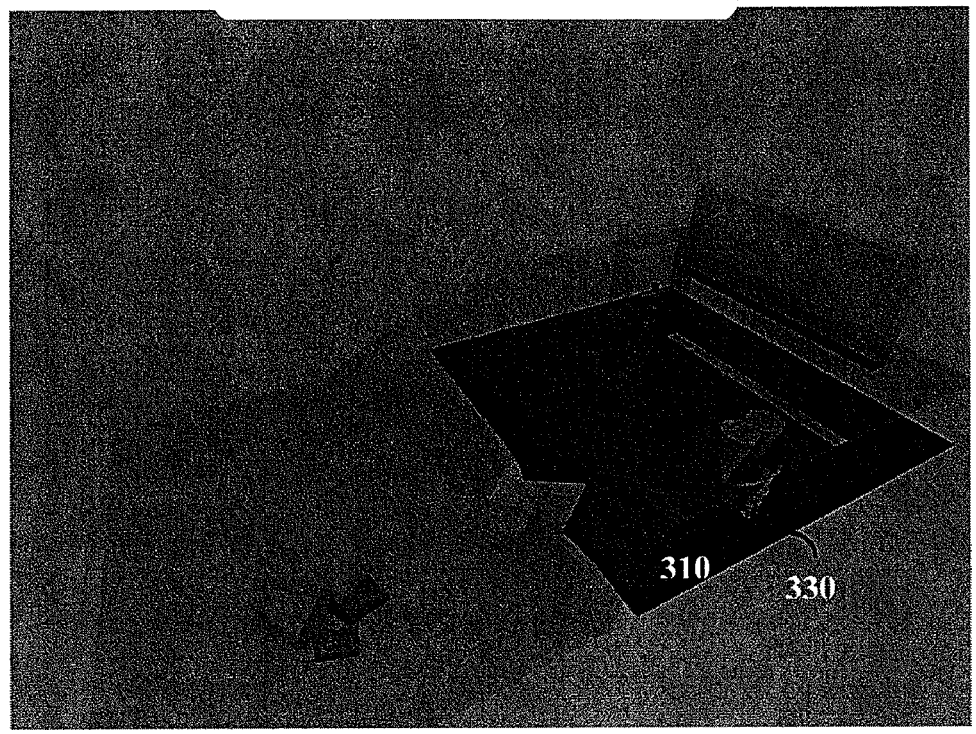

The fourth and fifth stage can be performed using an array processor, such as the processor described in U.S. patent application Ser. No. 11/089,029, entitled "Techniques for path finding and terrain analysis" assigned to common assignee and which is hereby incorporated by reference here in its entirely. This rendering process is repeated for each new level floor, for example, FIG. 3C shows the floor 330 below the floor level 310.

Figure 3D:
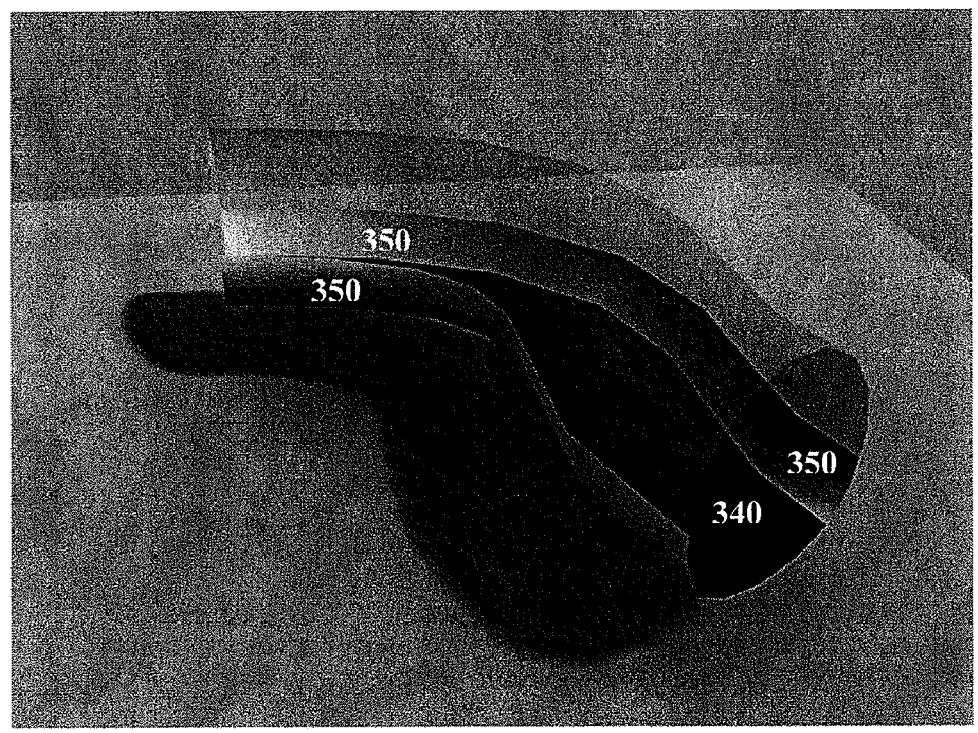

The graph-generation module 110 translates the bitmaps to nodes, edges and weights, thereby producing a semi-generated graph, for example, in the form of a grid. This is performed using mapping information stored in the dictionary to make translation decisions on areas that can be inferred from the graphical data (bitmaps). In addition, the graph-generation module 110 detects and marks areas (e.g., borders) where clear translation decisions cannot be taken. As illustrated in FIG. 3D, a ground surface 340 of the cave is determined using graphical module 120 and the areas near the cave's walls 350 using the physical module 140. It should be noted that nodes and edges are not generated for objects which are encapsulated within another object.

The semi-generated graph is sent to the physical module 140, which completes the graph by submitting collision queries to the game engine, and analyzing the responses. Specifically, the physical module 140 holds a list of place-NPC combinations that need to be tested. For each such combination, the module 140 submits a collision query to the game engine 160. The results returned from the game engine are analyzed and inserted in the graph as well in to the dictionary 130. The physical module 140 calculates the navigation time of an agent. For example, when the agent performs a "walk" action, the module 140 walks the agent to an adjacent node from its current location and measures the time.

To accurately generate the graph, the physical module 140 should process accurate collision information. However, in certain cases game engines cannot produce such accurate information by a single test because they keep internal hidden variables per agent. The physical module 140 can handle several very common cases of hidden variables without making any modification to game engine 160, but merely by querying the game engine 160.

An example for such a common case is a collisions system relying on a body's skin when processing collision queries. A skin is a region enveloping the body. The game engine 160 detects a collision as an overlap in skins, which can then be corrected without causing overlap in the core bodies. This results in situations where the skin is being squeezed and a body can be placed very close to another body, but reported as "not a collision". Cases where an agent is put near the body without that variable being set for the agents may result in an inaccurate graph. For example, a NPC may be placed near a wall and its skin may go across the wall. This problem is resolved by the physical module 140 and its world interface by testing twice near bodies. One test is performed without skin and the other with the skin. In the case described above, the movement into the wall generates no collision with a skin, but does generate a collision without the skin.

One of the tasks executed by the physical module 140 includes creating and updating the mapping information in the dictionary 130. With this aim, mapping information is derived from collision tests. For example, if a NPC can pass through a 2 meter wide passage in a normal terrain, it is determined that the NPC can pass through any passages wider than a 2-meter wide passage.

As mentioned earlier, the dictionary 130 includes mapping information that maps certain surface features to costs. These features may include, but are not limited to, passage height, i.e., how different roof heights affect the movement cost, passage width, i.e., how different width affects the movement cost, step height, slope, fall height, the material of the surface, and so on. In an exemplary implementation, the dictionary maps a combination of a NPC, an action performed by the NPC, the surface material, and one or more surface features, to a list of value-cost pairs. As an example, for a NPC walking on a slippery floor versus a regular floor, the costs of different slopes may be:

1. slope 0.1 costs 17/18 for regular/slippery floor respectively;
2. slope 0.2 costs 25/30 for regular/slippery floor respectively;
3. slope 0.4 costs 50/100 for regular/slippery floor respectively; and
4. slope 0.6 costs 107/infinite for regular/slippery floor respectively.

The mapping information is kept per NPC type and the dictionary 130 is managed once per game scene.

In accordance with another exemplary implementation of the disclosed teachings the generated graph may include non-navigational costs. That is, some movements harm the character (agent) which commits them. For example, a character walks out of a third-floor balcony usually reaches the ground quite quickly, but not in a good shape. This is accounted in the generated graph by marking, on each edge, whether it is lethal. Edges marked as "lethal" can be ignored by a path-finding process.

Figure 4:
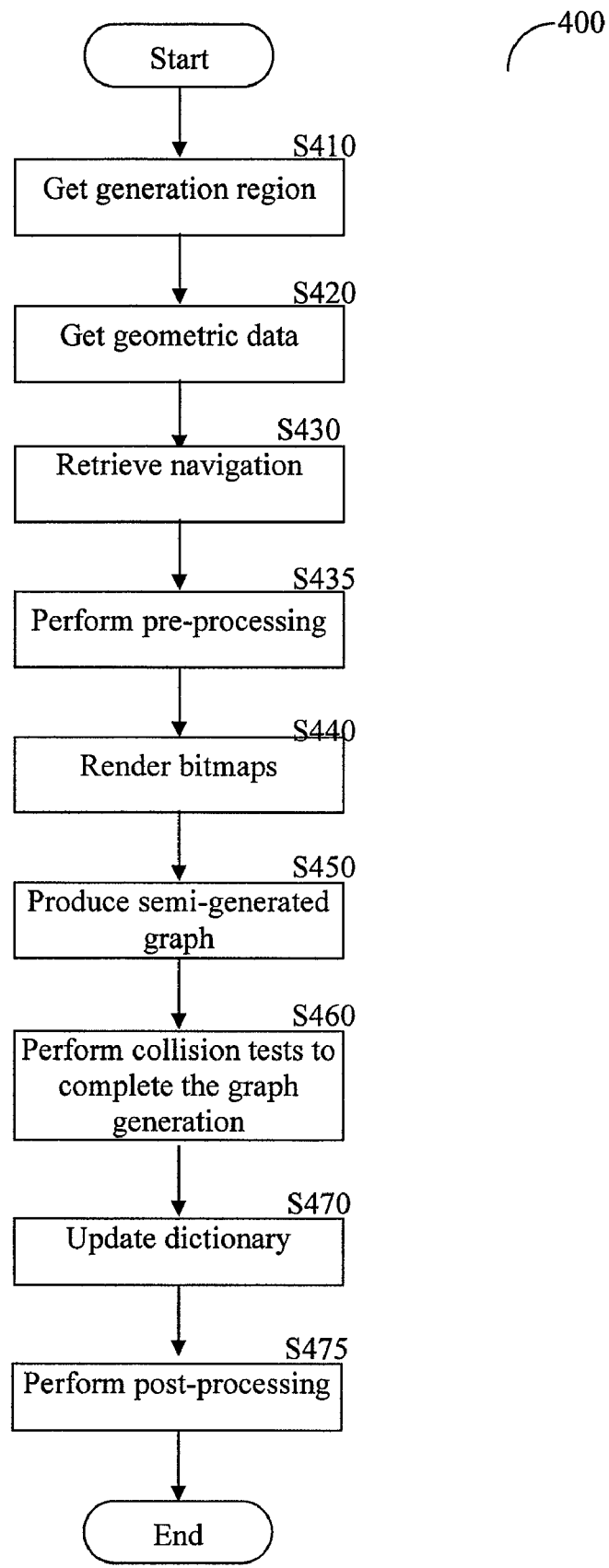
FIG. 4 is a flowchart describing an exemplary implementation of the graph generation method in accordance with the disclosed teachings.

FIG. 4 shows a non-limiting and exemplary flowchart 400 describing techniques for generating a navigation graph in accordance with aspects of the disclosed teachings. At S410, a region in the game's virtual world in which the graph should be generated is received. The region may be defined as an axis-aligned box in the virtual world. In addition, the method receives a list of generation parameters, such as the resolution and NPC types for which the graph is to be generated. At S420, geometric data in the generation region is retrieved. The geometric data includes polygon meshes describing objects, surfaces and obstacles in the generation region. At S430, the navigation costs for NPCs in the generation region are retrieved from the dictionary. Optionally at S435, a pre-processing of the generation region is performed to determine which parts of the region have been changed. This is done in order to reduce the time required for updating a graph. At S440, bitmaps of navigational data are rendered using the geometric data and navigational costs. As mentioned above, the bitmaps include information on walk-able surfaces, passages, surface material, heights and slopes of surfaces, and so on. Optionally a module that checks for changes is used to send only changed parts of the world to be rendered. At S450, a semi-generated graph is created by translating the bitmaps to nodes, edges and weights. At S460, collision tests on the semi-generated graph are performed in order to complete the graph generation. That is, areas in the semi-generated graph that are not clearly determined are processed by the physical modules. Also if the reason was lack of dictionary data, this data is filled from the query result. At S470, the dictionary is updated to include data derived from the collision tests. Optionally, at S475, post-processing of the graph is performed in order to reduce its size.

It should be noted that the method, system 100, the components of system 100 can be implemented in software, hardware, firmware, or any combination thereof.

Figure 5A:
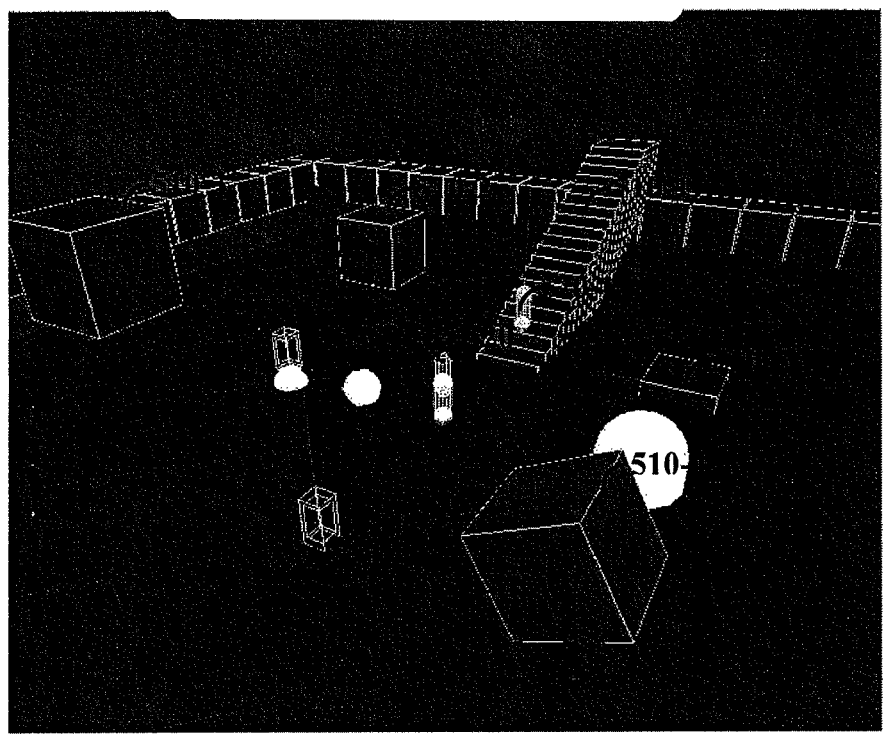
FIGS. 5A, 5B, 5C and 5D are pictures describing an exemplary implementation describing the operation of the graph generation.
Figure 5B:
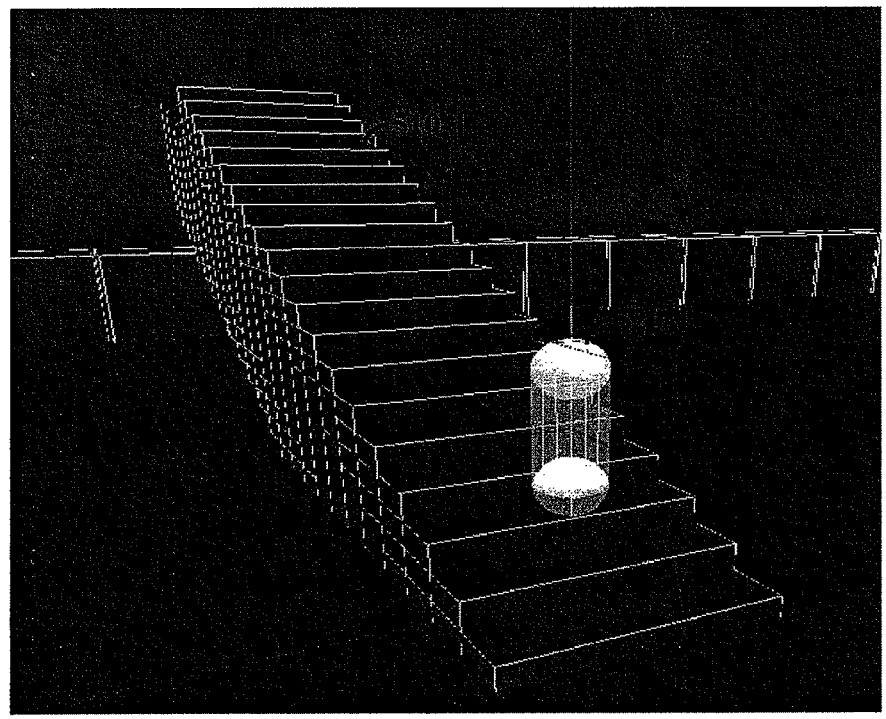
Figures 5C, 5D:
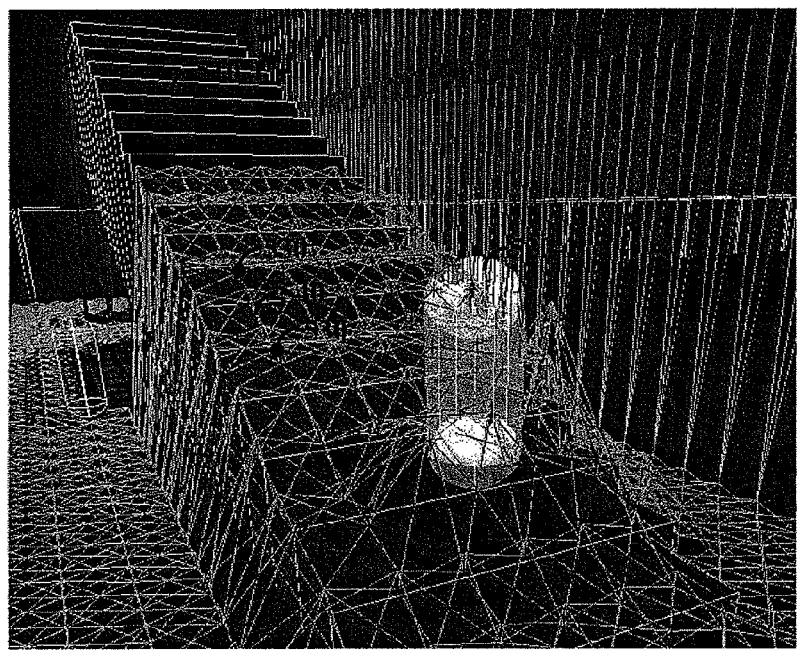

FIG. 5 provides an example for the operation of the graph generation method. The method will be described with reference to the exemplary game's scenes shown in FIG. 5. FIG. 5A is a virtual world of a game that includes objects 510 and agents 520. The generation region is shown in FIG. 5B and includes object 510-1 and agent 520-1. The object 510-1 is a stairs on which the agent 520-1 wants to climb. In order to determine the movement ability of the agent 520-1 navigational cost for a surface feature, steps, is retrieved from the dictionary. As an example, the table shown in FIG. 2 represents the cost to climb different step heights. Next, for each direction, the weight to move between two adjacent nodes (locations) is determined using rendered data and navigational costs. FIG. 5C shows an exemplary bitmap representing the costs to climb stairs 510-1, where the height difference between two steps is 0.5 meter (i.e., $\Delta h=0.5$ meter). The rendered data includes the height of each step with reference to the ground (h1=0, h2=0.5 m, h3=1 m, and so on). The graphical module calculates the height difference of two steps and inserts the respective cost into the bit map. It should be note that if the exact cost for a certain feature is not provided as part of the mapping information, the graphical module 120 computes the exact cost using linear extrapolation. In the same fashion, the weights of moving left, right, going downward are calculated. FIG. 5D shows the generated graph, where nodes edges are marked as 530 and 540 respectively. The weights of the edges 530 are not shown.

Other aspect of the disclosed teachings is a computer program product including a machine-readable media comprising instructions. The instructions are capable of enabling a computer to implement the techniques described above. It should be noted that the machine-readable media could be any media from which a computer can receive instructions, including but not limited to hard disks, RAMs, ROMs, CDs, magnetic tape, internet downloads, carrier wave with signals, etc. Also instructions can be in any form including source code, object code, executable code, and in any language including higher level, assembly and machine languages. The computer system is not limited to any type of computer. It could be implemented in a stand-alone machine or implemented in a distributed fashion, including over the internet.

While the disclosed teachings has been particularly shown and described with reference to exemplary implementations thereof, it will be understood by those skilled in the art that various changes in form and details may be made therein without departing from the spirit and scope of the disclosed teachings as defined by the appended claims.

What is claimed is:

1. A system adapted for generating navigation graphs in real time, the system comprising:
    a dictionary operable to maintain information mapping surface features to navigational costs;
    a graphical module operable to transform geometrical data of a virtual world and associated navigational costs obtained from the dictionary into navigation data;
    a graph-generation module operable to translate the navigation data into a semi-generated navigation graph; and
    a physical module operable to receive the semi-generated navigation graph, and generate an updated navigation graph based on collisions test.

2. The system of claim 1, further comprising:
    a pre-graph module adapted for determining which parts of the virtual world have changed; and
    a post-graph module adapted for minimizing the size of the updated navigation graph.

3. The system of claim 1, wherein the graphical module is coupled to a rendering subsystem.

4. The system of claim 3, wherein the transforming the geometrical data into navigation data comprises:
    receiving geometrical data of at least one region in the virtual world; and
    rendering, using the rendering subsystem, a plurality of bitmaps, which form the navigation data.

5. The system of claim 4, wherein the geometrical data comprises polygons describing at least objects, surfaces and obstacles in the region.

6. The system of claim 5, wherein the plurality of bitmaps include information about properties of a terrain in the region.

7. The system of claim 4, wherein the graph-generation module produces the semi-generated navigation graph by translating the bitmaps into nodes, edges and weights.

8. The system of claim 7, wherein translation decisions are performed based on the mapping information in the dictionary.

9. The system of claim 7, wherein the graph-generation module marks areas in the semi-generated navigation graph that can not be inferred from the bitmaps.

10. The system of claim 9, wherein the physical engine performs the collision tests on the marked areas.

11. The system of claim 10, wherein the physical module is further operable to update the mapping information based on results of the collision tests.

12. A method for generating a navigation graph in real-time, the method comprising:
    retrieving geometrical data of at least one region in a virtual world of a computer game;
    retrieving mapping information for said at least one region;
    rendering a plurality of bitmaps of navigation data using the geometrical data and the mapping information;

generating a semi-generated graph using the bitmaps; and generating the navigation graph based on collision tests performed on the semi-generated graph pre-processing the at least one region to determine changes in the at least one region wherein the navigation graph comprises navigation data for a game agent in the virtual world.

13. The method of claim 12, further comprising:

post-processing the generated navigation graph to reduce its size.

14. The method of claim 12, wherein the geometrical data comprises polygons describing at least objects, surfaces and obstacles in the at least one region.

15. The method of claim 12, wherein the plurality of bitmaps include information about properties of a terrain in the region.

16. The method of claim 12, wherein the generating the semi-generated graph comprises:

translating the bitmaps into nodes, edges and weights of a graph; and marking areas in the semi-generated graph that can not be inferred from the bitmaps.

17. The method of claim 16, wherein translating the bitmaps is performed based on the mapping information.

18. The method of claim 17, wherein the collision tests are performed on marked areas in the semi-generated graph.

19. The method of claim 17, wherein the mapping information comprises mapping of surface features to navigational costs.

20. A non-transitory computer-readable storage medium storing instructions to enable a computer to execute a method for generating a navigation graph in real-time, the method comprising:

retrieving geometrical data of at least one region in a virtual world of a computer game;

retrieving mapping information for said at least one region;

rendering a plurality of bitmaps of navigation data based on the geometrical data and the mapping information;

generating a semi-generated graph based on the bitmaps; and generating a navigation graph based on collision tests performed on the semi-generated graph.

* * * * *